United States Patent
Weideman (10) Patent No.: US 6,292,782 B1
(45) Date of Patent: *Sep. 18, 2001

(54) SPEECH RECOGNITION AND VERIFICATION SYSTEM ENABLING AUTHORIZED DATA TRANSMISSION OVER NETWORKED COMPUTER SYSTEMS

(75) Inventor: William Edward Weideman, Arlington, TX (US)

(73) Assignee: Philips Electronics North America Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/709,584

(22) Filed: Sep. 9, 1996

(51) Int. Cl.[7] .................................................... G10L 15/22
(52) U.S. Cl. ............................................. 704/273; 704/275
(58) Field of Search ................................... 704/273, 231, 704/200, 270, 275, 272

(56) References Cited

U.S. PATENT DOCUMENTS

| | | | |
|---|---|---|---|
| 5,127,043 | * | 6/1992 | Hunt et al. ............................... 379/88 |
| 5,297,194 | * | 3/1994 | Hunt et al. ............................... 379/88 |
| 5,343,529 | * | 8/1994 | Goldfine et al. ........................ 380/23 |
| 5,465,387 | * | 11/1995 | Mukherjee ........................... 455/26.1 |
| 5,517,558 | * | 5/1996 | Schalk ..................................... 379/88 |
| 5,610,981 | * | 3/1997 | Mooney et al. ........................ 380/25 |
| 5,761,329 | * | 6/1998 | Chen et al. ........................... 382/116 |
| 5,805,674 | * | 9/1998 | Anderson, Jr. ..................... 379/93.03 |
| 5,806,040 | * | 9/1998 | Vensko .................................. 704/273 |
| 5,838,682 | * | 11/1998 | Dekelbaum et al. ................. 370/351 |
| 5,901,203 | * | 5/1999 | Morganstein et al. ............. 379/88.02 |
| 5,907,597 | * | 5/1999 | Mark ................................. 379/93.03 |
| 5,915,001 | * | 6/1999 | Uppaluru ............................ 379/88.2 |

* cited by examiner

*Primary Examiner*—Richemond Dorvil
(74) *Attorney, Agent, or Firm*—Daniel J. Piotrowski (57) ABSTRACT

A system and apparatus for using speech recognition and verification to provide secure and authorized data transmissions between networked computer systems is provided. The system includes first and second network computer systems wherein a request for a transaction by user of the first computer system causes the user to be prompted to enter a spoken identifier such as a credit card number, PIN number or password. This spoken identifier is converted from speech data into speech feature data using either a resident software application or a downloaded application from the second computer system. The speech feature data is transmitted to the second computer system wherein speech recognition and verification engines identify the spoken identifier and determine whether or not the user who spoke the identifier is properly associated with the spoken identifier. Upon successful completion of this recognition and verification process, the requested transaction is completed.

24 Claims, 5 Drawing Sheets

SPEECH RECOGNITION AND VERIFICATION SYSTEM ENABLING AUTHORIZED DATA TRANSMISSION OVER NETWORKED COMPUTER SYSTEMS

TECHNICAL FIELD

The present invention relates to secure data transmission, and more particularly to a method and apparatus authorizing data transmission over a computer network environment utilizing a client/server architecture.

BACKGROUND OF THE INVENTION

The current expansion of computer network systems and linked architectures, such as the Internet, have greatly increased the opportunity for carrying out transactions through networked computers. Unfortunately, the performance of transactions via networked computers requires the transmission of sensitive data (credit card numbers, PIN numbers, passwords, etc.) over the communications network interconnecting the computers. A communications network is for the most part a nonsecure transmission environment that is subject to access by unauthorized third parties. An unauthorized party is able to get a hold of sensitive information by unlawfully monitoring computer communications over the communications network. This of course can be greatly damaging to an individual or business. Also, transfer of data over a communications network does not provide an easy way to ensure a party is authorized to transmit or receive sensitive data.

One current method for providing secure transmission of sensitive data in a computer network environment relies on encryption of the data prior to transmission. Unfortunately, newly devised decryption methods and faster computer systems continually make it easier for unauthorized third parties to crack any encryption code, thus rendering sensitive data vulnerable to unauthorized attack. Once the sensitive data has been decrypted by an unauthorized individual, this party may now use this sensitive data without authorization to make purchases or carry out any number of unauthorized transactions. Since many current encryption methods have no mechanism for verifying the identity of the person submitting the sensitive information, the unauthorized individual may continue their unlawful activities for a substantial period of time.

Other current systems providing authentication require that additional hardware be purchased by the user and an authentication card. The user must insert the authentication card into an associated card reader to access sensitive data. If the card is illegally obtained by an unauthorized individual, this person may still access the sensitive data. Thus, a system enabling secure transmission of sensitive data and verification of a sender's identity would greatly benefit the expanded use of transactions occurring over networked computer systems.

BRIEF SUMMARY OF THE INVENTION

The present invention overcomes the foregoing and other problems with a system and method using speech recognition and verification engines to enable secure data transmissions between networked computer systems. The preferred embodiment of this invention utilizes a client/server architecture wherein a request for a particular transaction by a user at the client unit causes the server unit to prompt the user for a spoken identifier, such as a credit card number, PIN number, password, etc. The user speaks an identifier into a microphone connected to the client unit and the spoken data comprising the identifier is converted into speech feature data. This conversion is carried out by a locally resident software application or may be done by an application or plug-in applet that has been downloaded from the server unit in response to the requested transaction.

The speech feature data is transmitted over a computer communications link from the client unit to the server unit for further processing. Optionally, the speech feature data may be secured by additional state of the art processes, such as encryption, before transmission of the speech feature data to the server unit. A speech recognition engine located at the server unit uses the speech feature data to identify and confirm the spoken identifier entered by the user. The speech feature data is then further processed by a speech verification engine to confirm that the user who entered the spoken identifier is in fact the user associated with the spoken identifier and is authorized to perform a requested transaction.

Additionally, the speech feature data for the identifier may be compared to previously transmitted versions of the speech feature data for the identifier to determine if it matches any of the previously transmitted versions. When an exact match exists, the transmitted speech feature data is marked as suspect so that further approval steps may be taken. If the spoken identifier is recognized and verified as being associated with the user entering the identifier and no questions arise due to an exact match with previously transmitted data, the transaction request is completed.

The foregoing has outlined some of the more pertinent aspects of the present invention. These aspects should be construed to be merely illustrative of some of the more prominent features and applications of the invention. Many other beneficial results can be attained by applying the disclosed invention in a modified manner as will be described. Accordingly, other aspects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
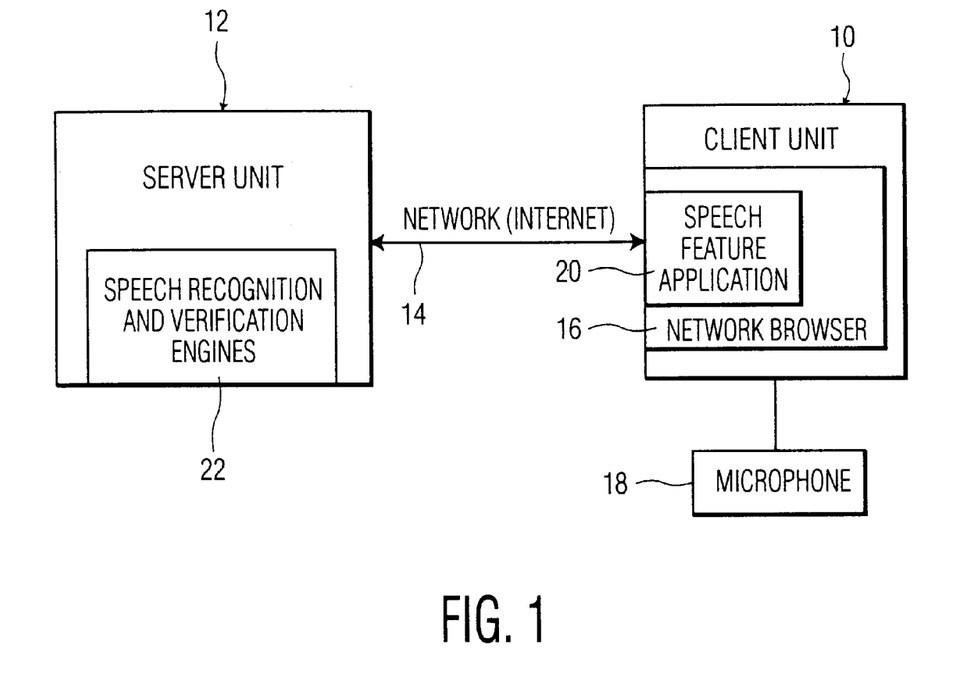
FIG. 1 is a block diagram illustrating the environment of operation of the present invention.

Referring now to the drawings and more particularly to FIG. 1, there is illustrated the general operating environment of the present invention. The preferred embodiment is described with respect to a client/server architecture. A client unit 10 requests a particular transaction or service from the server unit 12 via a networked computer connection 14, such as the Internet. The server unit 12 includes speech recognition and verification engines 22 which will be more fully discussed in a moment. The client and server units may comprise standalone computers or computer systems.

The client unit 10 includes a network browser 16, in the case of an Internet connection a web browser, and microphone 18. The network browser 16 enables a user to navigate between computers of the interlinked computer network while the microphone 18 enables entry of spoken identifiers at the client unit 10. A speech feature application 20 enables the conversion of speech data to speech feature data for transmission over the computer network to the speech recognition and verification engines 22 of the server unit 12. The speech feature application 20 may be a plug-in applet, application or helper application that may be downloaded over the computer network to enable the conversion of speech data to speech feature data or may be a software application resident within the client unit 10. While FIG. 1 illustrates the speech feature application as operating within the network browser 16, it should be appreciated that a helper application operating externally of the browser may be used.

Figure 2A:
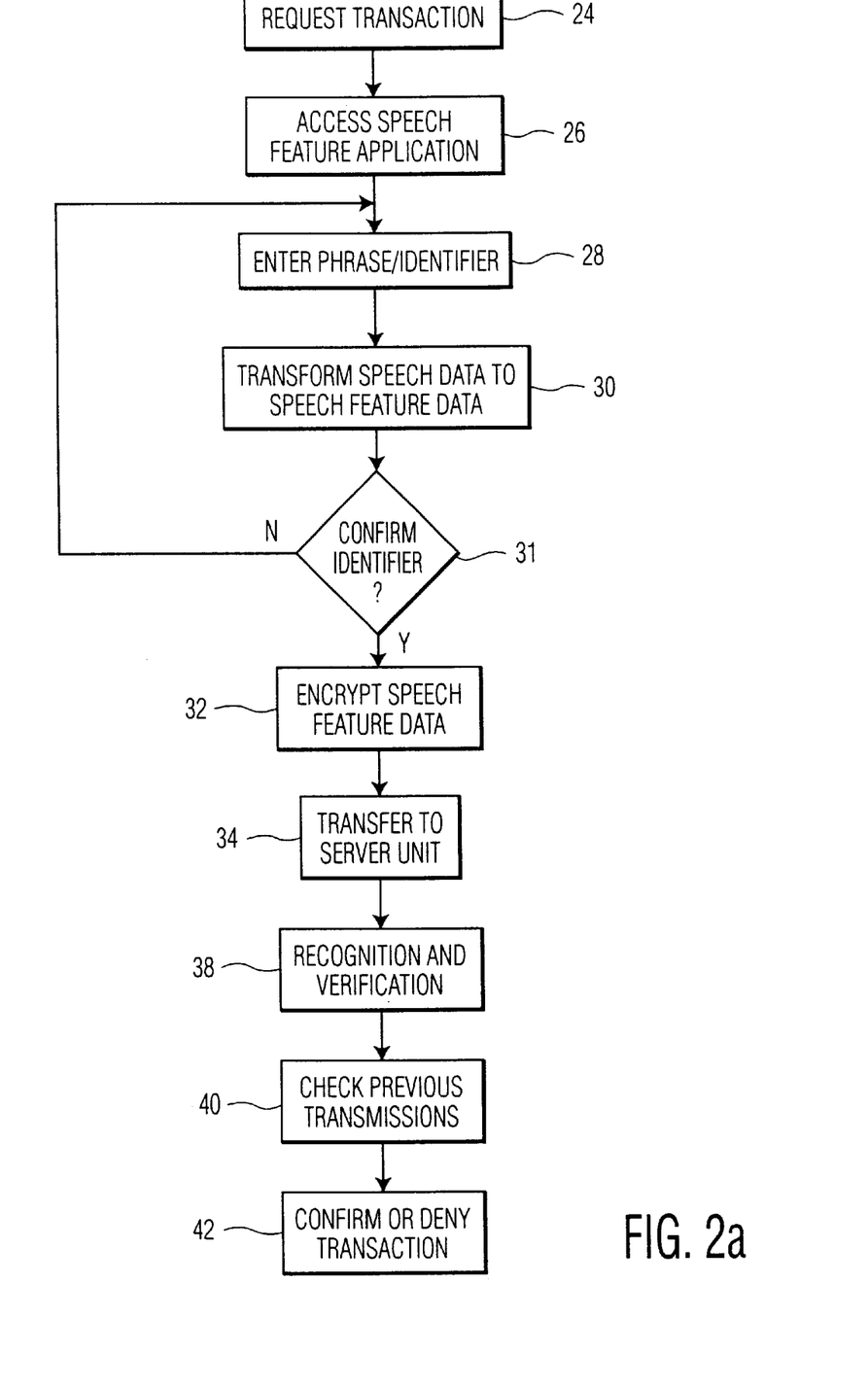
FIGS. 2a and 2b are flow diagrams illustrating the method for providing secure communications.
Figure 2B:
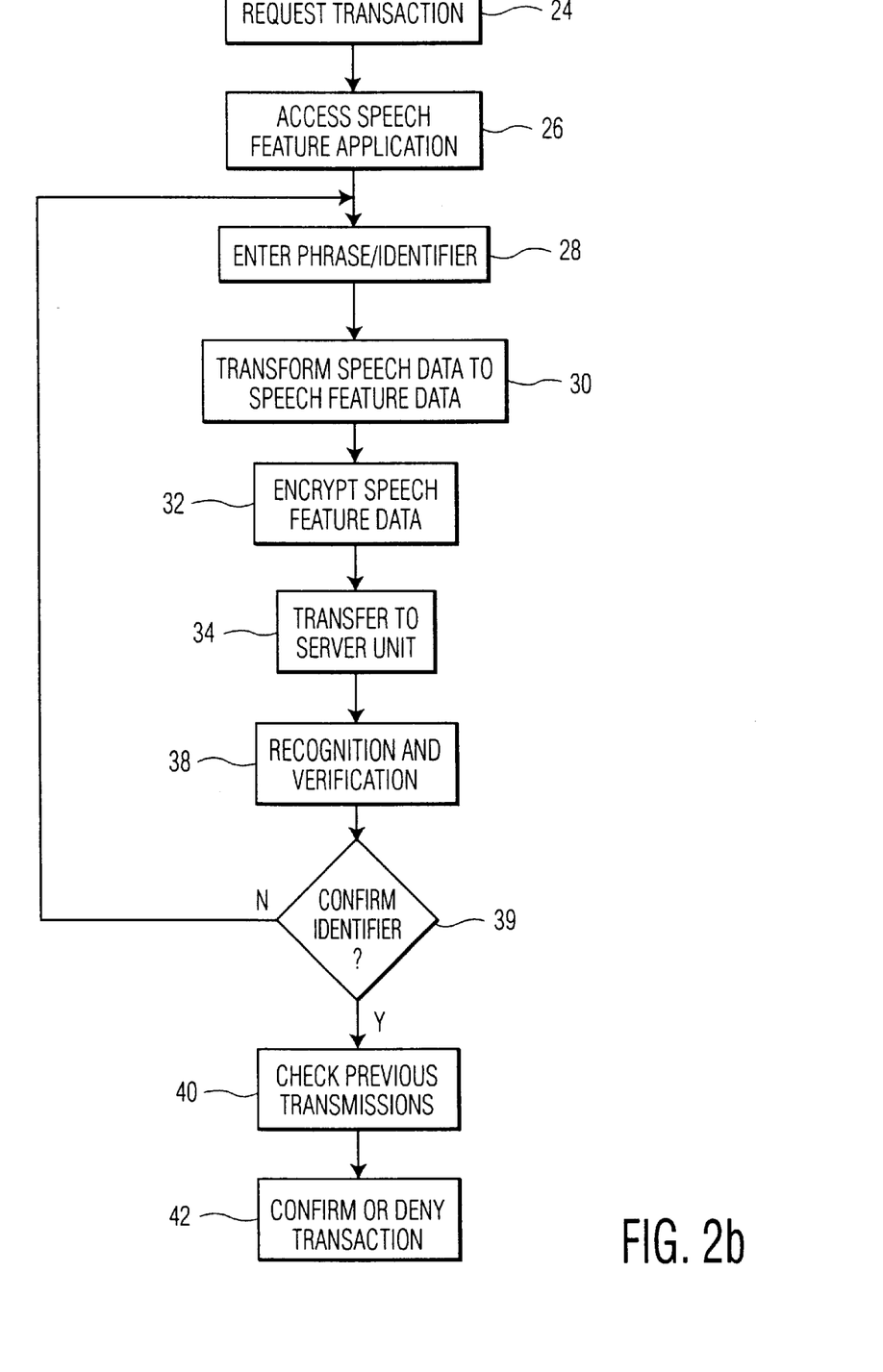

Referring now also to FIGS. 2a and 2b, there are illustrated two flow charts describing the general method of operation of the present invention. FIG. 2a illustrates a method wherein recognition of the identifier is confirmed before transmission to the local server while FIG. 2b illustrates a method wherein confirmation of the recognition is performed at the remote server. The FIGS. 2a and 2b will be described together with similar steps having the same reference numerals. Initially, a user at the client unit 10 makes a transaction request at step 24 to initiate the procedure. The transactions may include a purchase, request for restricted data, etc. The request for a transaction initiates access at step 26 to the speech feature application 20. This access may entail merely opening a resident application on the client unit 10 or automatically downloading an application, helper application or plug-in applet over the Internet connection 14.

Once the speech feature application 20 is ready, the user is prompted to speak a key phrase or identifier at step 28. This phrase may be a credit card number, expiration date, account number, personal identification number or a password. The speech feature application 20 transforms at step 30 the speech data representing the phrase from the microphone 18 into speech feature data used for recognition and verification by the speech recognition and verification engines 22. Conversion of the speech data to speech feature data prior to transmission over the networked computer connection 14 is desirable due to the fact that the number of bits necessary to represent speech features are smaller than the number of bits necessary to represent the speech itself. However, it should be noted that the speech data may be transmitted to the server unit 12 suck that transformation, recognition and verification all occur at the server unit.

In the embodiment of FIG. 2a, the transformed speech data may be initially recognized at optional step 31 to confirm that the identifier can be correctly identified by the speech recognizer prior to transmission of the data. This step would use a speech recognition algorithm as will be more fully described in a moment. If the data is properly recognized at step 31, control passes off to optional step 32 for further processing of the speech feature data. Otherwise, the user is prompted to reenter the phase or identifier at step 28.

Referring back to both FIGS. 2a and 2b, in an optional step, the speech feature data may be encrypted at step 32 to provide an additional level of security during the transmission process. More security may be obtained by layering additional levels of security on top of the encryption. The order of the transmitted data may also be scrambled to provide an additional layer of encryption. The encrypted data is then transferred at step 34 to the server unit 12 wherein the speech recognition and verification engines 22 are used to recognize the transmitted information and verify the user transmitting the information at step 38 has the authority to request a transaction using the spoken identifier.

In the alternative embodiment of FIG. 2b, a determination is made at step 39 whether or not the spoken identifier has been correctly recognized by the recognition algorithm. This may be done in a variety of ways including asking the user to repeat the spoken identifier if a predetermined certainty level of recognition is not achieved or by preparing speech feature data for the transmission back to the client unit and then having this speech feature data processed by the client unit to generate a message indicating the recognized spoken identifier.

Referring again to FIGS. 2a and 2b, once a positive speaker recognition and verification is achieved, the additional procedure of comparing at step 40 the speech feature data for the current transmission against previous transmissions of speech feature data for the same identifier enables a determination of whether or not an exact match exists with a previous transmission. Any exact matches are marked as suspect and routed to the server unit 12 for appropriate action. This process relies on the fact that speech features from one utterance to the next will be slightly different each time the utterance is spoken by the user. Comparison of the utterance to previous transmissions prevents an unauthorized user from intercepting a previous transmission and merely recording and replaying the information to achieve unauthorized access. If the transmitted information and the identity of the user are verified, the transaction is confirmed at step 42 and the transaction is completed.

Figure 3:
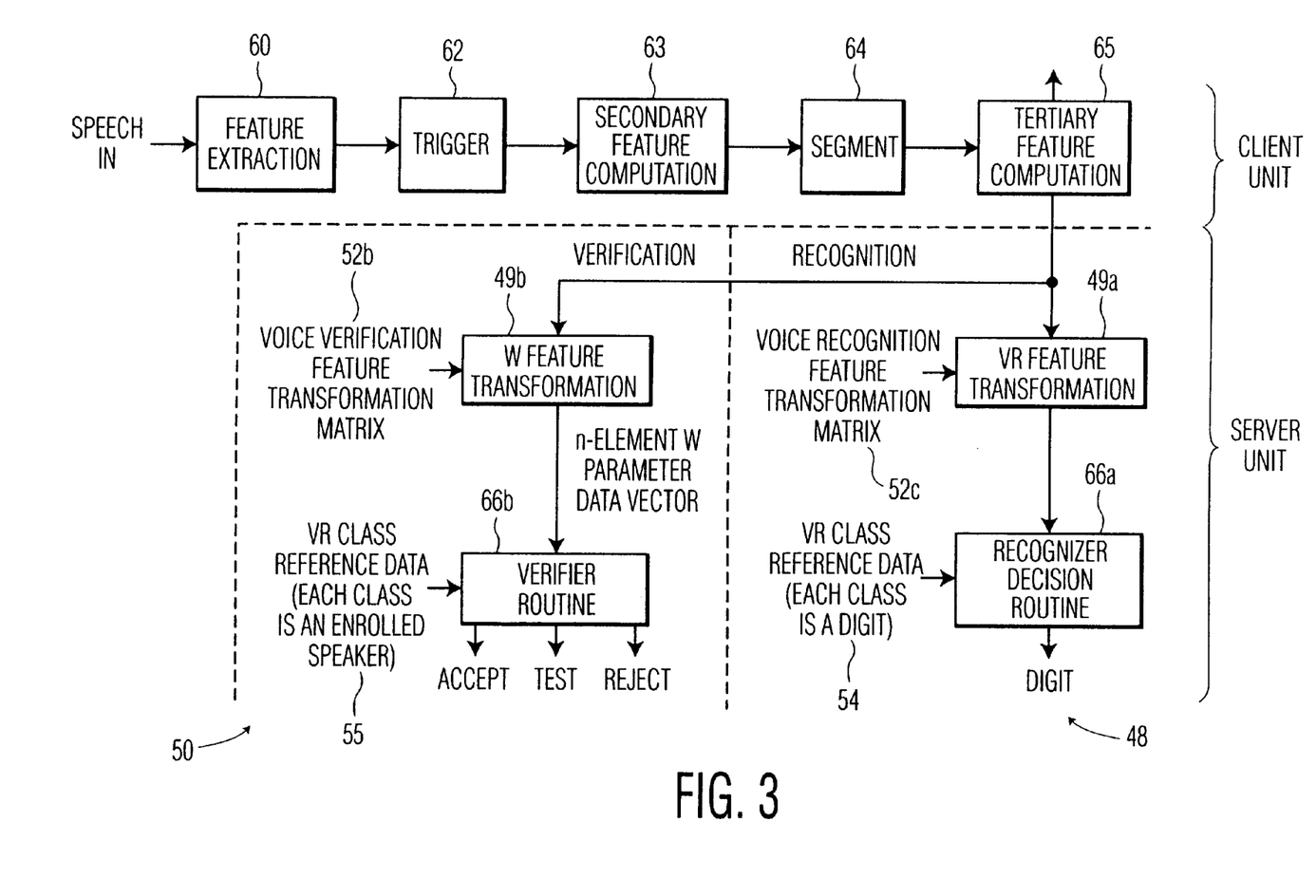
FIG. 3 is a flow diagram of the speech recognition and verification algorithms.

Referring now to FIG. 3, a block diagram is shown of an embodiment of the voice recognition and verification algorithms 48 and 50. The functional blocks set forth in the upper portion of the block diagram comprise those steps which are performed by the speech feature application 20 located at the client unit 10. These blocks comprise speech processing means for carrying out a first tier of a multistage data reduction process. In particular, a speech is input to the speech feature application 20, a feature extractor 60 extracts a set of primary features that are computed in real time every 10 milliseconds. The primary features include heuristically-developed time domain features (e.g. zero crossing rates) and frequency domain information such as fast fourier transform (FFT) coefficients. The output of the feature extractor 60 is a reduced set (approximately 40,000 data points/utterance instead of the original approximately 80,000 data points/utterance) and is applied to a trigger routine 62 that captures spoken words using the primary features. The trigger routine 62 is connected to a secondary feature routine 63 for computing "secondary features" from the primary features. The secondary features preferably result from non-linear transformations of the primary features. The output of the routine 63 is connected to phonetic segmentation routine 64. After an utterance is captured and the secondary features are computed, the routine 64 provides automatic phonetic segmentation. To achieve segmentation, the phonetic segmentation routine 64 preferably locates voicing boundaries by determining an optimum state sequence of a two-state Markov process based on a sequence of scalar discriminate function values. The discriminate function values are generated by a two-class Fisher linear transformation of secondary feature vectors. The voicing boundaries are then used as anchor points for subsequent phonetic segmentation.

After the phonetic boundaries are located by the phonetic segmentation routine, the individual phonetic units of the utterance are analyzed and so called "tertiary features" are computed by a tertiary feature calculation routine 65. These tertiary features preferably comprise information (e.g., means or variances) derived from the secondary features within the phonetic boundaries. The tertiary features are used by both the voice recognition algorithm 48 and the voice verification algorithm 50 as will be described. The output of the routine 65 is a tertiary feature vector of approximately 300 data point/utterance. As can be seen then, the upper portion of FIG. 3 represents the first tier of the multistage data reduction process which significantly reduces the amount of data to be analyzed and transferred over the Internet connection 14 that still preserves the necessary class of separability, whether it is digit-relative or speaker-relative, necessary to achieve recognition or verification, respectively. The middle portion of FIG. 3 represents a second tier of the data reduction process, and as will be described, comprises the transformation routines 49a and 49b occurring at the voice verification and recognition engines 22 of the server unit 12 (FIG. 1).

To effect speaker independent voice recognition, the tertiary features are first supplied to the voice recognition linear transformation routine 49a. This routine multiplies the tertiary feature vector by the voice recognition feature transformation data (which is a matrix) 52a to generate a voice recognition parameter data factor for each digit. The output of the transformation routine 49a is then applied to a voice recognition statistical decision routine 66a for comparison with the voice recognition class of reference data 54. The output of the decision routine 66a is a yes/no decision identifying whether the digit is recognized and, if so, which digit was spoken.

Specifically, a decision routine 66a evaluates a measure of word similarity for each of the eleven digits (zero through 9 and "OH") in the vocabulary. The voice recognition class reference data 54 includes various elements (e.g., acceptance thresholds for each digit class, inverse covariances and mean vectors for each class) used by the decision strategy. For a digit to be declared (as opposed to being rejected), certain acceptance criteria must be met. The acceptance criteria may include, but need not be limited to the following: The voice recognition algorithm determines the closest match between the class reference data and the voice recognition parameter vector for the digit; this closest match is a so-called "first choice." The next closest match is a "second choice." Each choice has its own matching score. The digit is declared if (1) the matching score of the first choice is below a predetermined threshold, and (2) the difference between the matching scores of the first choice and the second choice digits is greater than another predetermined threshold. When all words of the spoken identifier have been recognized, the voice recognition portion of the method is complete.

To effect voice verification, the tertiary features are also supplied to a linear transformation routine 49b that multiplies each tertiary feature vector (output from routine 65) by the voice verification feature transformation data (which is a matrix) 52b. The output of the routine 49b is an N element vector of voice verification parameter data for each digit of the password, with N preferably approximately equal to 25. The voice verification parameter data vector is then input to a verifier routine 66b which also receives the voice verification class reference data for the caller. Specifically, the voice verification class reference data is provided from the voice verification reference database 55. As noted above, the address in the database 55 of the user's voice verification class reference data is defined by the user's password derived by the voice recognition algorithm 48.

Verifier routine 66b generates one of three different outputs: ACCEPT, REJECT and TEST. An ACCEPT output may authorize the user to from the transaction database. The REJECT output is provided if the verifier disputes the purported identify of the user. The TEST output initiates the prompting step wherein additional follow-up questions are asked to verify the user's identity.

Figure 4A:
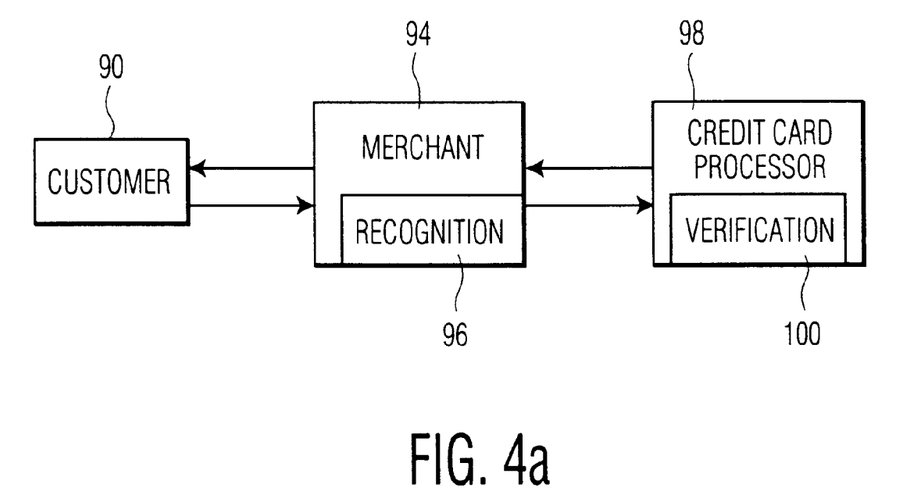
FIGS. 4a and 4b illustrate manners of use for the system of the present invention.

Referring now to FIGS. 4a and 4b, there are illustrated alternative embodiments of the present invention wherein the speech recognition and speech verification engine software is distributed. In FIG. 4a, a customer 90 speaks an identifier which is transformed into speech feature data and transmitted to the merchant server 94. The merchant server 94 runs the speech features through the recognition engine software 96 to recognize the identifier provided by the customer 90. The customer is queried once the spoken identifier is recognized to confirm it has been correctly identified. Once confirmed, the recognized identifier, the features for speech verification and the transaction data are sent to the payment gateway processor server 98 for verification, using speech verification engine software 100, of the authorization of the customer providing the spoken identifier to carry out a requested transaction. Once the identifier is verified, the payment gateway processor server 98 transmits authorization to complete the transaction to the merchant server. Transmissions preferably occur over a secure channel such as a dedicated phone line or dedicated computer network between the payment gateway processor server 98 and the merchant server 94. Once the merchant server 94 obtains a successful authorization, the merchant completes the transaction with the customer and delivers the product or services.

Figure 4B:
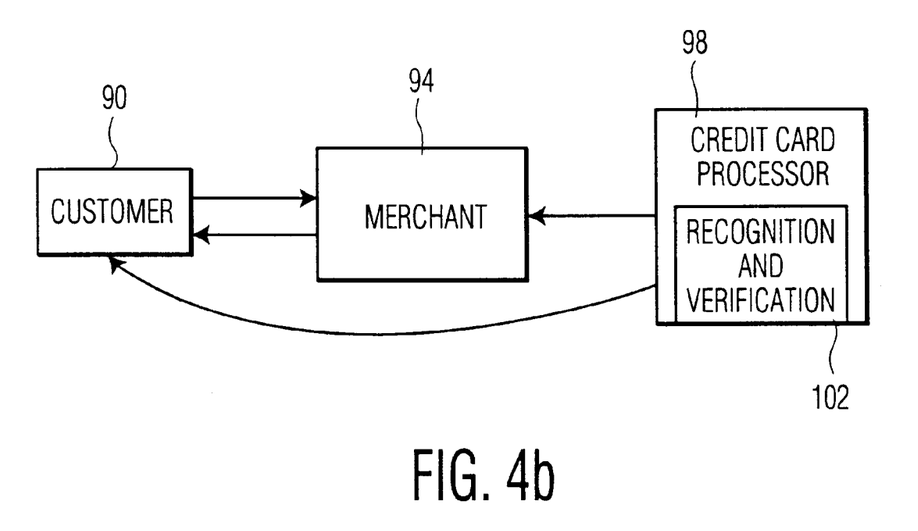

FIG. 4b illustrates another method wherein the merchant server 94 simply passes the speech feature data and transaction data to the payment gateway processor server 98 so that recognition and verification are both accomplished by software engines 102 at the payment gateway processor server 98. This method may be used to limit the possibility of merchant fraud. The payment gateway processor server 98 confirms recognition with the customer and determines the required response to the credit authorization requests and notifies the merchant of the results. Upon recognition and verification of authority to perform the transaction, transaction approval is transmitted to the merchant server 94.

Use of the embodiments illustrated in FIGS. 4a and 4b may occur in the manner of a user speaking their credit card authorization number into a terminal or unit located at a merchant location. Alternatively, the user may enter their credit card number via a magnetic card reader terminal or key pad entry and speak an identifier such as their name that does not reveal any secret to an eavesdropper.

It should be appreciated by those skilled in the art that the specific embodiments disclosed above may be readily utilized at a basis for modifying or designing other structures for carrying out the purpose of the present invention. It should also be realized by those skilled in the art that such equivalent constructions do not depart from the spirit and scope of the invention as set forth in the appended claims.

What is claimed is:

1. A system for providing secure data transmissions between networked computer systems, comprising:
   at least one server computer connected to a plurality of client computers through a computer communications link for receiving transaction requests and speech feature data from the client computers;
   means within the server computer for prompting one of the client computers to request a spoken identifier from the user of the one client computer in response to the transaction request;

a recognition engine for deriving speech feature data from the spoken identifier;

a verification engine for verifying the spoken identifier represented by the speech feature data is associated with a user speaking the identifier; and means for completing the transaction request upon verification of the association of the user with the spoken identifier.

2. The system of claim 1 wherein the speech recognition engine is on the server computer.

3. The system of claim 1 wherein the verification engine comprises:

a database for storing the speech feature data for previously received spoken identifiers;

a comparator for comparing the speech feature data to the speech feature data stored in the database for a user, said verification engine rejecting access when an exact match is detected between the speech feature data and the speech feature data stored in the database for a user.

4. The system of claim 1 wherein the computer communications link comprises the Internet.

5. The system of claim 1 further including means for decrypting speech feature data received from the client computer.

6. A method for securely transmitting data between computer systems on a computer communications link, comprising the steps of:

prompting a user at a first computer system to enter a spoken identifier in response to a transaction request by the user on the first computer;

converting the spoken identifier from speech data to speech feature data using a speech transformation engine;

transmitting the speech feature data to a second computer system;

identifying the spoken identifier using a speech recognition engine;

verifying the spoken identifier was entered by a user associated with the spoken identifier using a speech verification engine; and providing the requested transaction from the second computer to the first computer if the identified spoken identifier was spoken by the associated user.

7. The method of claim 6 further including the step of confirming the spoken identifier was correctly identified by the speech recognition engine.

8. The method of claim 7 further including the step of re-prompting the user to enter a spoken identifier if the spoken identifier is not correctly identified.

9. The method of claim 6 further including the step of transferring a speech feature extraction engine to the first computer system in response to the transaction request.

10. The method of claim 9 further including the step of decrypting the speech feature data prior to identifying the spoken identifier.

11. The method of claim 6 further including the steps of:

comparing the speech feature data received from the first computer system to previously received speech feature data to determine if any identical matches exist; and identifying the speech feature data as suspect if the received speech feature data exactly matches previously received speech feature data.

12. The method of claim 6 further including the step of encrypting the speech feature data prior to transmission to the second computer system.

13. The method of claim 6 further including the step of prompting the user at the first computer system to enter a first identifier containing sensitive information and wherein the spoken identifier comprises verifying information.

14. A method for securely transmitting between computer systems on a computer communications link, comprising the steps of:

prompting a user at a first computer system to speak a character string beginning with a first character and ending with a last character thereof in response to a transaction request by the user on the first computer;

generating speech feature data for each spoken character of the character string;

transmitting the speech feature data to a second computer system over the computer communications link;

applying the speech feature data of the character string and voice recognition transformation data to a voice recognition feature transformation to generate a first set of parameters for each spoken character of the first character string, the first set of parameters for use in a voice recognition system;

applying the speech feature data and voice verification feature transformation data to a voice verification feature transformation to generate a second set of parameters for each spoken character of the first character string, the second set of parameters for use in a voice verification system;

recognizing the character string using the first set of parameters;

verifying the user is associated with the character string using the second set of parameters; and providing the requested transaction over the computer communications link from the second computer to the first computer if the user is verified and the character string is recognized.

15. The method of claim 14 further including the step of transferring a speech feature extraction engine to the first computer system in response to the transaction request.

16. The method of claim 14 wherein the step of verifying further includes the steps of:

comparing the speech feature data received from the first computer system to previously received speech feature data to determine if any identical matches exist; and identifying the received speech feature data as suspect if the speech feature data exactly matches previously received speech feature data.

17. The method of claim 14 further including the step of encrypting the speech feature data prior to transmission to the second computer system.

18. The system of claim 17 further including the step of decrypting the speech feature data prior to identifying the spoken identifier.

19. A system for the providing secure data transmissions between networked computer systems comprising:

at least one server computer including a processor for receiving transaction requests and speech feature data;

a plurality of client computers connected to the at least one server through a computer communications link, each of the client computers including a processor;

wherein the server computer prompts one of the client computers to request a spoken identifier from the user of the one client computer in response to the transaction request;

a recognition engine for deriving speech feature data from the spoken identifier;

a verification engine for verifying the spoken identifier represented by the speech feature data is associated with a user speaking the identifier; and means for completing the transaction request upon verification of the association of the user with the spoken identifier.

20. A server computer for use in a system for the providing secure data transmissions between networked computer systems, the server computer comprising:

a processor for receiving transaction requests and speech feature data from a plurality of client computers connected to the server through a computer communications link, wherein the server computer prompts one of the client computers to request a spoken identifier from the user of the one client computer in response to the transaction request;

a verification engine for verifying the spoken identifier associated with a user speaking the identifier.

21. The server computer of claim 20 further including a recognition engine for deriving speech feature data from the spoken identifier and wherein the verification engine used the speech feature data for verifying the spoken identifier.

22. The server computer of claim 21 further including means for completing the transaction request upon verification of the association of the user with the spoken identifier.

23. A client computer for use in a system for the providing secure data transmissions between networked computer systems comprising:

a processor connected to at least one server computer through a computer communications link, the processor for sending a transaction requests and speech feature data to the at least one server computer and for receiving a request from the server computer for a spoken identifier from a user of the client computer in response to the transaction request.

24. The client computer of claim 23 further including a recognition engine for deriving speech feature data from the spoken identifier.

* * * * *